Oct. 12, 1965   M. M. MARISIC ETAL   3,211,331
METHOD AND APPARATUS FOR CARBONATING LIQUIDS
Filed May 6, 1963   2 Sheets-Sheet 1
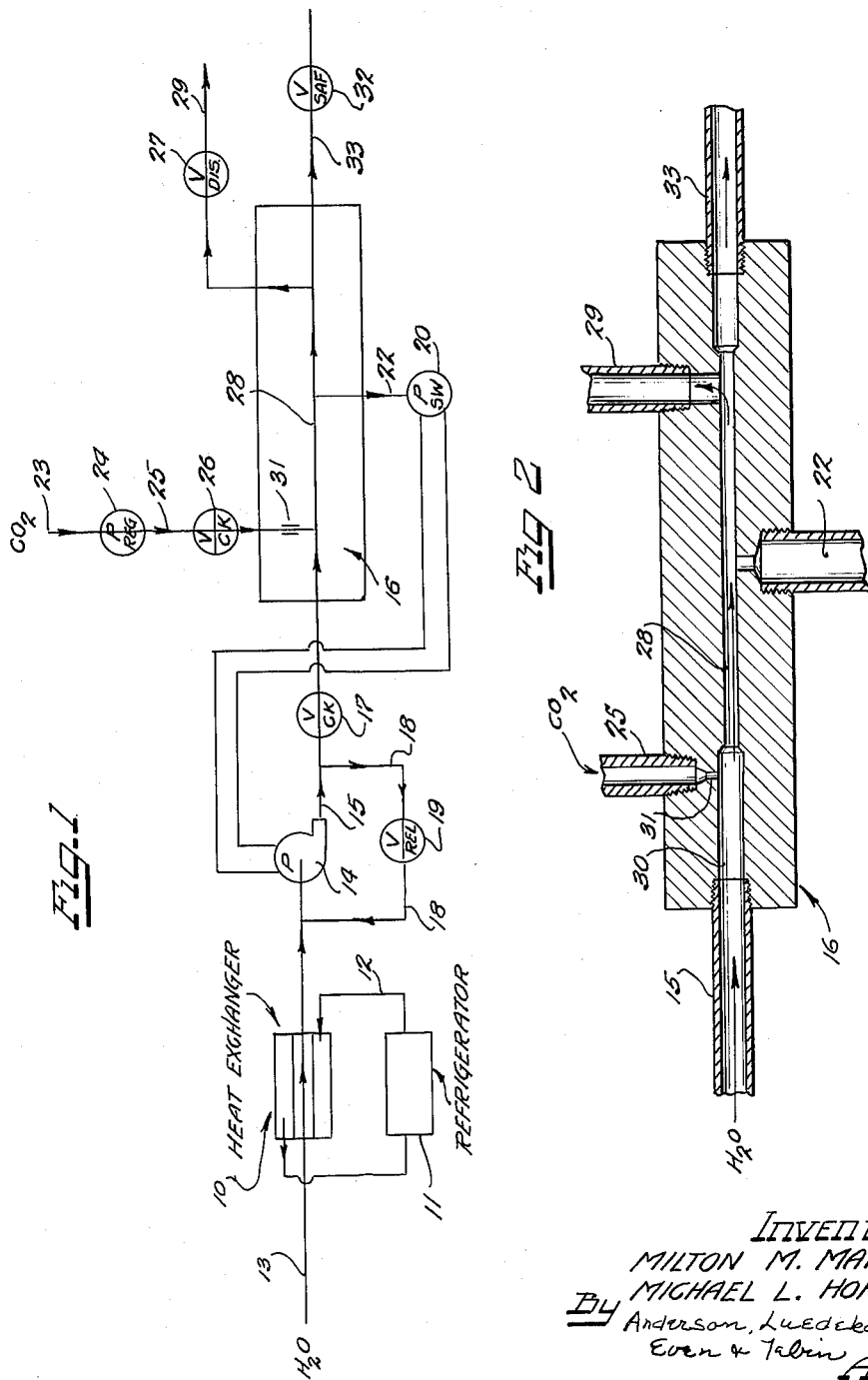

Oct. 12, 1965   M. M. MARISIC ETAL   3,211,331
METHOD AND APPARATUS FOR CARBONATING LIQUIDS
Filed May 6, 1963   2 Sheets-Sheet 2

Inventors
MILTON M MARISIC
MICHAEL L HOFFMAN
By Anderson, Luedeka, Fitch,
Even + Tabin
Attys

United States Patent Office

3,211,331
Patented Oct. 12, 1965

3,211,331
METHOD AND APPARATUS FOR
CARBONATING LIQUIDS
Milton M. Marisic, Elgin, and Michael L. Hoffman,
Chicago, Ill., assignors to General Dynamics Corporation, New York, N.Y., a corporation of Delaware
Filed May 6, 1963, Ser. No. 278,020
6 Claims. (Cl. 222—1)

The present invention relates to an apparatus and process for carbonating liquids, and more particularly to a system suitable for carbonating either an intermittently or continuously flowing liquid stream in accordance with the amount of carbonated liquid produced for use at a particular time or period when a demand is made upon the system.

Although the invention is of special utility in connection with the purveying or dispensing of liquids at the point of sale for immediate consumption, for example, at a soda fountain where the demand is intermittent and the amount needed for a normal single dispensing operation is relatively small, the system has a more general application for the production or dispensing of large amounts of carbonated liquids.

Heretofore, it has been the general practice first to carbonate water or other beverage liquid, at room temperature or at the temperature of water flowing direct from a supply main, and then cool or refrigerate the carbonated liquid so that a supply of cooled carbonated water may be kept in a tank or other suitable reservoir, large enough to supply a number of servings. According to this old practice, the carbonating step of the process is performed at spaced intervals during the day, whenever the amount of carbonated liquid stored in the tank must be replenished. Also, because these carbonated liquid storage tanks are generally of quite large capacity, and supercharged with $CO_2$, the pressure in the tank is quite high, subjecting the entire reservoir and the associated refrigeration apparatus, to severe mechanical stresses, often resulting in bothersome and expensive leakages, and occasionally causing explosions.

Carbonators equipped with tank reservoirs should be mounted in a horizontal position because the level of the liquid in the tank is employed to actuate a mechanism which regulates the operation of the carbonator pump.

Also, by reason of the fact that the water to be carbonated is sometimes at a temperature of 70° F. to 80° F., the amount of $CO_2$ which can be conveniently dissolved in the liquid is less than can be dissolved in a liquid which has been cooled to a lower temperature, for example between 34° and 38° F.

The main purpose or object of the present invention is to produce a process or apparatus for automatically carbonating a desired quantity of liquid for dispensing in accordance with the demand of the moment, without the necessity of storing a large amount of carbonated liquid in a dispensing tank or reservoir.

A further object of the invention is to provide a system or apparatus in which the liquid which is to be carbonated may be reduced to a relatively low temperature before it is carbonated, so that a high degree of carbonating may be readily effected just prior to the time when the liquid is served or dispensed to satisfy the demand.

A further object is to provide a system in which the apparatus may be mounted in any position without adverse effect upon the operation, and does not require purging of air which may come out of the water during the operation.

Another object of the invention is to provide an arrangement or system in which, except for the $CO_2$ storage cylinder, no part of the system which is under the pressure of $CO_2$ gas, is large enough to constitute any significant danger of leakage or explosion damage.

A further object of the invention is to provide a system which is substantially self-regulating, capable of accommodating itself to all reasonable conditions of operation, and in general, to provide a system of carbonating liquids which is relatively inexpensive to manufacture and install, rugged, and substantially fool-proof in operation, and of general all-around economy and efficiency.

In the following description there is disclosed, as one embodiment of the invention, a system and apparatus such as may be installed for use in serving a carbonated beverage in a soda fountain, a vending machine, or similar retail outlet, where the beverage is consumed on the premises, and hence is dispensed in relatively small individual servings. A proper understanding of said description will be facilitated by reference to the drawings hereto attached.

In said drawings:

FIGURE 1 is a diagrammatic flow sheet of the system and apparatus;

FIGURE 2 is a diagrammatic longitudinal section of the manifold or conduit through which the pre-cooled liquid flows when it is being carbonated;

*The water supply*

Figure 3:
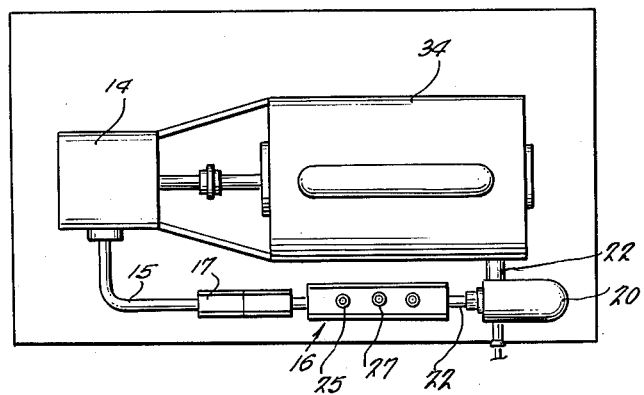
FIGURE 3 is an elevation of the carbonation unit which may be connected to a refrigerated source of water, to a supply of $CO_2$ under pressure, and to a delivery pipe and valve for dispensing the carbonated liquid.
Figure 4:
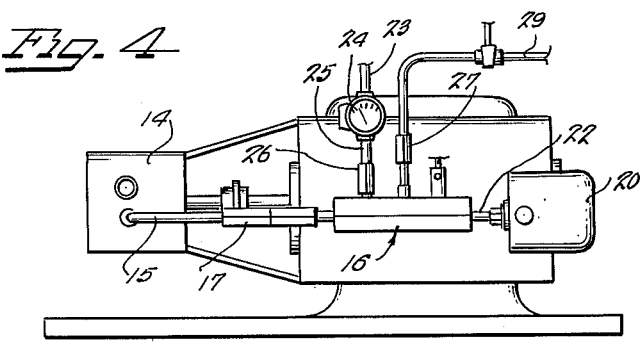
FIGURE 4 is a plan view of the apparatus shown in FIGURE 3.

Referring to the flow sheet, FIGURE 1, the element designated by the numeral 10 represents diagrammatically a heat exchanger, preferably of the counter-flow type. A conventional refrigerator 11 delivers cooled brine to the heat exchanger through a pipe 12. Generally, the water supply pipe 13 may be connected to the usual public supply main. In the event that the public water supply pressure is low, or subject to variation, a pump 14 operated by a suitable motor may be employed to build up the pressure of the delivery pipe 15 to the pump to about 30 to 80 pounds per square inch, depending upon the requirements of the particular installation. Water discharged by the pump into the delivery pipe 15 is connected to the carbonating manifold 16 through a check valve 17 so as to prevent back-flow from the manifold into the pump 14, when the manifold water pressure exceeds the pressure in the delivery pipe 15.

It is desirable to employ a by-pass or return-flow pipe 18 in which there is placed a regulating valve 19 by means of which the pressure of water in delivery pipe 15 is maintained below a predetermined value whether any pre-cooled water is flowing into the manifold or not. In this case, the pump may be driven continuously.

In addition to the foregoing arrangement for maintaining the desired pressure in the supply of pre-cooled water to the manifold 16, it is usually desirable to employ an arrangement for operating the pump 14 only during the time that water is being delivered into the manifold 16, for carbonation during a dispensing operation. In that case, the pump may be started and stopped by means of a pressure-controlled switch 20 which is connected to the manifold conduit 28 through a pipe 22. It will be understood that when the pressure in the conduit 28 falls below a desired figure, the pressure controlled switch 20 is actuated to close a circuit for activating an electric motor, which drives the pump 14.

*The $CO_2$ gas supply*

Highly compressed liquid $CO_2$ is stored in the usual supply tank or cylinder (not shown) which is connected to the gas supply pipe 23 in which there is placed a pressure-regulating valve 24 by means of which the $CO_2$ in the form of gas, is delivered at a prescribed pressure of about 90 to 130 p.s.i. to the manifold 16 through a gas inlet pipe 25 which is equipped with a suitable check valve 26.

*The carbonating manifold*

The pump 14 is located quite close to the cooler 10 and also quite close to the manifold 16. Thus, the path of travel between the cooler and the carbonated water discharge valve 27 is relatively short, so that there will be a relatively insignificant rise in the temperature of the liquid when it flows through the manifold. Also, the volume of the liquid in the conduit 28 of the manifold 16 is quite small, compared with the amount of carbonated liquid which is normally withdrawn from the outlet 29 in a single serving operation, the length of the conduit 28 being only a few inches. The water inlet opening 30 is only about ¼ inch in diameter, and may be reduced downstream of the gas inlet pipe 25. Because of the relatively small size of the conduit 28 when the water discharge valve 27 is opened, the velocity of the liquid stream flowing through the conduit between the gas inlet pipe 25 and the outlet 29 is relatively high, for example, not less than about 3 feet per second. The actual velocity of flow is determined by the gauge pressure of the incoming liquid prior to the time when it passes the opening of the gas inlet pipe 25.

The pressure at which the $CO_2$ gas enters the conduit 28 by means of the opening or orifice 31 may be about 90 pounds or more per square inch, as compared with a pressure of about 50 pounds or more per square inch for the water in the water inlet opening 30 of the conduit 28. Normally there will be a difference in pressure of about 30 pounds or more per square inch which generally will be sufficient to properly carbonate the flowing stream at the particular velocity (3 feet per second or more) of the stream of liquid flowing through the manifold during a normal dispensing operation. In the present instance, the diameter of the orifice 31 may be approximately .015".

In actual practice, it is not usually considered feasible or desirable to change the size of the orifice 31. Hence, in order to obtain proper carbonation of the liquid when the output valve is fully opened, the amount of gas admitted to the manifold to obtain optimum results is generally regulated by raising or lowering the pressure of the gas which is admitted to the conduit 28. It will be understood however, that with a given size of orifice, the rate of gas flow through the orifice can never exceed sonic velocity. Hence, the pressure of the gas entering the orifice should be below the pressure corresponding to sonic velocity. For an apparatus which will deliver about ½ gallon of water per minute at 60 p.s.i. in the manifold, the gas regulator should be set lightly below 110 p.s.i. so that the gas inlet pressure would be less than 1.8 times the manifold pressure. Under these conditions, with a liquid velocity of about 3 feet per second, one volume of water would take up 4.2 volumes of $CO_2$. If it is desired to obtain optimum carbonation without waste of $CO_2$, the velocity of the liquid stream should be closely adjusted. The water discharge or dispensing valve 27 should be of a type which, when operated, must be fully opened or fully closed, so that there will be no substantial variation in the velocity of flow of the liquid through the manifold.

In actual practice, it is found desirable to provide a safety valve 32 in outlet 33, for preventing the development of dangerous pressures in the manifold or piping due to improper operation of the system.

*The operation*

In the particular embodiment shown and described, the water is chilled to a temperature of between 34° and 38° F. and will enter the inlet at a pressure of about 30 to 80 p.s.i., normally about 60 p.s.i. The gas inlet pressure through the orifice 31 preferably should be slightly less than 1.8 times the manifold pressure, and the pressure setting of the gas regulator should be at about 110 p.s.i. or less. The pressure differential as stated, will provide adequate carbonation of the liquid stream flowing at about 3 feet per second or more, between the gas inlet and the product outlet in the manifold when the water discharge valve 27 is fully opened. However, when the water discharge valve 27 is fully closed, there will be no liquid flowing through the manifold conduit and, consequently, the pressure in the manifold conduit will rise to approximately the pressure of the gas in the gas inlet pipe as determined by the setting of the pressure regulating valve 24, or alternately, the liquid pressure developed by the pump will increase to the value determined by the setting of the regulating valve 19. This rise in pressure in the manifold will actuate the liquid pressure switch 20 which will serve to switch off the pump motor 34.

When the carbonated water discharge valve 27 is opened for a dispensing operation, the area of the opening is many times the area of the orifice 31, so that the static pressure which had existed in the manifold conduit 28 will be reduced to a relatively low point because of the relatively small area of the gas-inlet orifice 31. Consequently, the pressure control switch 20 will be actuated to switch on the motor 34 which thereupon will commence pumping the pre-cooled water into the pipe 15 which serves the manifold. Meanwhile, a pressure differential will have been established between the gas inlet pipe 25 and the conduit 28 so that as soon as the cooled water commences to flow through the conduit 28, the gas will flow through the orifice 31 and into the high speed flowing stream of water thereby effecting a thorough agitation of the stream by means of the inflowing gas. By the time the gas in the stream reaches the outlet end of the conduit, it will have been completely absorbed by the flowing stream. It will be understood that, because of the low temperature of the water, a much more thorough carbonation can be effected than with water at a higher temperature, since the solubility of $CO_2$ in water is in inverse proportions to the temperature. Also, the lower the temperature of the cooled liquid, the more gas will be retained in the carbonated liquid.

When the carbonated water discharge valve 27 is closed, gas will continue to flow through the orifice 31 until the pressure in the manifold has been built up to a level approaching the pressure of the gas in the gas supply line, or alternately to the pressure developed by the pump operating with no flow through the manifold, whereupon the pressure controlled switch 20 will be operated, and the pump motor 34 will stop.

Where conditions permit, the pump 14 may be operated continuously, excessive pressure being avoided by the use of the by-pass pipe 18 and the regulating valve 19, in which case the pressure controlled switch 20 may not be needed.

It will be understood that instead of operating the motor switch by means of a pressure controlled switch, said motor switch may be operated by a relay, or mechanically, as an incident to the manual opening or closing of the water discharge valve 27.

In certain cases where the public water supply is uniform, and at a sufficiently high pressure, the pump and associated parts may be eliminated.

A patent is solicited for any and all herein disclosed patentable subject matter invented by applicants.

The embodiment disclosed herein may be changed or modified without departing from the scope of the invention.

Various features now believed to be new and patentable are set forth in the appended claims.

We claim:

1. For use in an apparatus capable of automatically producing and dispensing a desired quantity of a carbonated liquid in accordance with the demand, without the necessity of tapping a reservoir containing a pre-made batch of carbonated liquid, the combination of, (a) a conduit for conveying a stream of liquid and having, at one end, an inlet for supplying under pressure, a liquid to be carbonated, and at the other end, a normally closed dispensing outlet for the carbonated liquid, (b) said conduit also having between said liquid inlet and outlet, an inlet orifice for admitting $CO_2$ gas into said stream under a pressure which is higher than the liquid pressure, (c) the internal cross-sectional area of said conduit at the said gas inlet, being small enough so as to provide a stream velocity high enough to effect proper carbonation when the outlet is opened as an incident to an average dispensing operation, (d) the arrangement including means for preventing back-flow of liquid through said water inlet when the dispensing outlet is closed.

2. For use in an apparatus capable of automatically producing and dispensing a desired quantity of a carbonated liquid in accordance with the demand, without the necessity of tapping a reservoir containing a pre-made batch of carbonated liquid, the combination of, (a) a conduit for conveying a stream of pre-cooled liquid and having, at one end, an inlet for supplying the liquid to be carbonated, and at the other end, a normally closed dispensing outlet for the carbonated liquid, (b) said conduit also having between said liquid inlet and outlet, an inlet orifice for admitting into said stream $CO_2$ gas under a pressure which is substantially higher than the pressure of the liquid in the conduit, (c) the arrangement including means for supplying the liquid under a pressure sufficient under normal operation to move said stream past said gas orifice at a sufficient speed to effect adequate instantaneous carbonization of the liquid, and for automatically maintaining the said liquid pressure when the outlet is opened to withdraw a serving of treated liquid, (d) the liquid inlet being provided with a check-valve for preventing liquid from escaping when the static liquid pressure in the conduit exceeds the pressure of the liquid supply because of the closing of the dispensing outlet.

3. For use in an apparatus capable of automatically producing and dispensing a desired quantity of carbonated liquid in accordance with the demand, without the necessity of tapping a reservoir containing a pre-made match of carbonated liquid, the combination of, (a) a conduit for conveying a stream of pre-cooled liquid and having, at one end, an inlet for supplying, under a normally maintained pressure of a plurality of atmospheres, a liquid to be carbonated, and at the other end a normally closed outlet for the carbonated liquid, (b) said conduit also having between said liquid inlet and outlet, an inlet orifice connected to a source of $CO_2$ which is at a pressure substantially higher than that of the liquid in the conduit, but not in excess of that required to impart a sonic velocity to the $CO_2$ gas discharged through the orifice, (c) the volume of said conduit between said gas inlet and the liquid outlet being less than the volume of carbonated liquid generally required per average dispensing operation, (d) and means for pre-cooling the uncarbonated liquid before it is supplied through the liquid inlet, (e) the arrangement including means for normally maintaining the pressure of the liquid flowing through the conduit at a sufficient pressure so that it will flow past said orifice at a speed of at least about 3 feet per second, when the outlet is opened to withdraw a serving of treated liquid.

4. For use in an apparatus capable of automatically producing and dispensing a desired quantity of carbonated liquid in accordance with the demand, without the necessity of tapping a reservoir containing a pre-made batch of carbonated liquid, the combination of, (a) a conduit for conveying a stream of liquid and having at one end, an inlet for supplying, under a normally maintained pressure of a plurality of atmospheres, a liquid to be carbonated, and at the other end, a normally closed dispensing outlet for the carbonated liquid, (b) said conduit also having between said liquid inlet and outlet, an inlet orifice for admitting $CO_2$ into said stream under a pressure substantially above the pressure in the conduit but not in excess of that required to impart a sonic velocity to the $CO_2$ gas discharged through the orifice.

(c) the volume of said conduit between said gas inlet and the liquid outlet being less than the volume of carbonated liquid generally required per average dispensing operation, (d) and means for pre-cooling the uncarbonated liquid before it is supplied through the liquid inlet, (e) the arrangement including means for automatically restoring substantially normal pressure of liquid flowing into the conduit when the outlet is opened to withdraw a serving of treated liquid, (f) the speed of the liquid stream when the outlet is opened, being at least about 3 feet per second during a serving operation.

5. For use in a system capable of automatically producing and dispensing a desired quantity of a carbonated liquid in accordance with the demand, without the necessity of tapping a reservoir containing a pre-made batch of carbonated liquid, the method which comprises, (a) providing a supply of pre-cooled water which is to be carbonated, (b) flowing a stream of said pre-cooled water at a speed of not less than about 3 linear feet per second, through a conduit having a volume capacity substantially less than that required for an average dispensing operation, (c) while injecting $CO_2$ gas into said flowing stream through an orifice which connects said conduit with a supply of $CO_2$ gas under a pressure considerably higher than the pressure of the liquid flowing in said stream, (d) the pressure of the supply of gas entering the conduit relative to the size of the orifice being such as to supply gas at a sufficient rate to effectively carbonate the flowing stream during the dispensing operation.

6. For use in a system capable of automatically producing and dispensing a desired quantity of a carbonated liquid in accordance with the demand, without the necessity of tapping a reservoir containing a pre-made batch of carbonated liquid, the method which comprises, (a) providing a source of pre-cooled uncarbonated water under a gauge pressure of at least 30 pounds per square inch and connected through a check valve to the inlet end of a conduit which also has (p) at its other end a normally closed valve-controlled dispensing outlet for carbonated liquid and (q) between said inlet and outlet, a gas inlet orifice connecting said conduit with a supply of $CO_2$ under a pressure considerably higher than the pressure of the inlet liquid, (r) the area of the outlet when opened, being many times the area of the orifice, (b) opening the outlet so as to (s) reduce the static pressure in the manifold to below the inlet liquid pressure and thereby (t) cause the liquid to flow past said orifice, through the conduit, (u) thereby causing $CO_2$ gas to enter the conduit and to be dissolved in the flowing stream dispensed through said outlet opening, (c) closing the outlet at the conclusion of the dispensing operation, thereby permitting the entering gas to build up in the conduit a normal static pressure until the pressure of the gas supply and in the conduit are in balance.

References Cited by the Examiner

UNITED STATES PATENTS

| | | | |
|---|---|---|---|
| 1,490,727 | 4/24 | Billows | 62—390 X |
| 1,925,446 | 9/33 | Huntley | 62—390 X |
| 2,085,956 | 7/37 | Clarke et al. | 226—146 X |
| 2,327,910 | 8/43 | Levine | 62—390 X |
| 2,514,773 | 7/50 | Kromer | 222—396 X |
| 2,823,833 | 2/58 | Bauerlein | 222—129.2 |
| 2,996,222 | 8/61 | Botkin | 222—67 |
| 3,011,681 | 12/61 | Kromer | 222—146 X |
| 3,111,091 | 11/63 | Hopkinson | 103—262 |

FOREIGN PATENTS 82,371  10/95  Germany.

RAPHAEL M. LUPO, *Primary Examiner.*